(12) United States Patent
Lin

(10) Patent No.: US 8,439,076 B2
(45) Date of Patent: May 14, 2013

(54) FAUCET MODULE

(76) Inventor: Wen-Tsung Lin, Fangyuan Township (TW)

( * ) Notice: Subject to any disclaimer, the term of this patent is extended or adjusted under 35 U.S.C. 154(b) by 313 days.

(21) Appl. No.: 12/878,024

(22) Filed: Sep. 8, 2010

(65) Prior Publication Data

US 2012/0055571 A1 Mar. 8, 2012

(51) Int. Cl.
*F16K 21/00* (2006.01)

(52) U.S. Cl.
USPC .................................. 137/801; 4/677; 4/678

(58) Field of Classification Search .................. 137/801; 4/675–678
See application file for complete search history.

(56) References Cited

U.S. PATENT DOCUMENTS

| 991,703 | A | * | 5/1911 | Crane et al. ....................... 4/676 |
| 1,728,492 | A | * | 9/1929 | Kaufman ........................... 4/695 |
| 1,758,708 | A | * | 5/1930 | Leddon .......................... 137/359 |
| 5,022,429 | A | * | 6/1991 | Rollini et al. ................. 137/218 |

* cited by examiner

*Primary Examiner* — Craig Schneider

(57) ABSTRACT

A faucet module has a base, a valve chamber formed in the base, a cold water inlet port, a hot water inlet port and an outlet port in communications with a cold water inlet pipe, a hot water inlet pipe and an outlet pipe respectively, a first threaded section formed at an outer periphery of an opening of the valve chamber, a flange formed around all the pipes at a predetermined position away from the bottom face of the base, a protrusion having a second threaded section respectively formed at an end of each pipe below the flange, each of the base, the valve chamber, the cold water inlet port, the hot water inlet port, the outlet port, the cold water inlet pipe, the hot water inlet pipe, the outlet pipe, the first threaded section, the flange, the protrusion and the second threaded section formed as an entire unit.

8 Claims, 7 Drawing Sheets

FAUCET MODULE

BACKGROUND OF THE INVENTION

1. Field of the Invention

The present invention relates to a faucet module which requires lower manufacture cost and time.

2. Description of the Related Art

Currently, typical faucets, as shown in FIG. 7, comprises a metal base 80, and the base 80 has a valve chamber at its top surface which is used for placing a control valve 81. A cold water inlet port, a hot water inlet port and an outlet port are drilled at an inner bottom surface of the valve chamber. Then, a cold water inlet pipe 82, a hot water inlet pipe 83 and an outlet pipe 84 are assembled by welding onto the bottom end of the base 80 match the cold water inlet port, the hot water inlet port and the outlet port, and a C shape flange 85 is attached on the cold water inlet pipe 82, the hot water inlet pipe 83 and the outlet pipe 84 to gather the cold water inlet pipe 82, the hot water inlet pipe 83 and the outlet pipe 84 together. During the installation, the faucet body 86 and the C shape flange 85 provide two opposite forces onto a platform and a nut 87 secures the C shaped flange 85 tightly.

However, the prior art faucet has following drawbacks: 1. the base 80, the cold water inlet pipe 82, the hot water inlet pipe 83, the outlet pipe 84 and the C shape flange 85 are all separately manufactured, therefore high manufacturing cost and longer time are required. 2. The valve chamber, the cold water inlet port, the hot water inlet port and the outlet port of the base 80 are formed by drilling which also requires high manufacturing cost and longer time. 3. The cold water inlet pipe 82, the hot water inlet pipe 83 and the outlet pipe 84 are installed by welding technique, sometime poor welding skill might causes water leakage. 4. The base 80, the cold water inlet pipe 82, the hot water inlet pipe 83 and the outlet pipe 84 are all made of metal, which increase the entire weight dramatically.

Therefore, it is desirable to provide a faucet module to mitigate and/or obviate the aforementioned problems.

SUMMARY OF THE INVENTION

An objective of the present invention is to provide a faucet module which can reduce manufacturing cost and time.

In order to achieve the above-mentioned objectives, A faucet module comprises a base, a valve chamber formed in the base, and a bottom of the base is in communications with a cold water inlet pipe, a hot water inlet pipe and an outlet pipe. Furthermore, an inner bottom surface of the valve chamber has two spaced positioning recesses, and one side of the two positioning recesses is provided with a mixing trough. A cold water inlet port, a hot water inlet port and an outlet port are respectively formed in the two positioning recesses and the mixing trough, such that the cold water inlet port, the hot water inlet port and the outlet port are in communications with the cold water inlet pipe, the hot water inlet pipe and the outlet pipe. A first threaded section is formed at an outer periphery of an opening of the valve chamber, and a C-shaped flange is formed around the cold water inlet pipe, the hot water inlet pipe and the outlet pipe at a predetermined position away from the bottom face of the base. a protrusion having a second threaded section are respectively formed at an end of the cold water inlet pipe, the hot water inlet pipe and the outlet pipe below the flange, and all of the base 11, the valve chamber, the positioning recesses, the mixing trough, the cold water inlet port, the hot water inlet port, the outlet port, the cold water inlet pipe, the hot water inlet pipe, the outlet pipe, the first screw thread section, the flange, the protrusion and the second screw thread section formed as an entire unit by a plastic injection forming method.

Compare to the prior art, the faucet module of the present invention has following benefits: 1. The faucet module has the base, the cold water inlet pipe, the hot water inlet pipe, the outlet pipe and the flange as an entire unit, it is easier to be manufactured and assembled. 2. The faucet module has the valve chamber, the cold water inlet port, the hot water inlet port and the outlet port as an entire unit, there is no need to drill holes on the faucet module, which can reduce the manufacture cost. 3. The cold water inlet pipe, the hot water inlet pipe and the outlet pipe are formed an entire unit on the base, therefore, there is no welding required, which can reduce the chance of water leakage. 4. The faucet module is made by the plastic injection method; therefore the total weight can be reduced.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
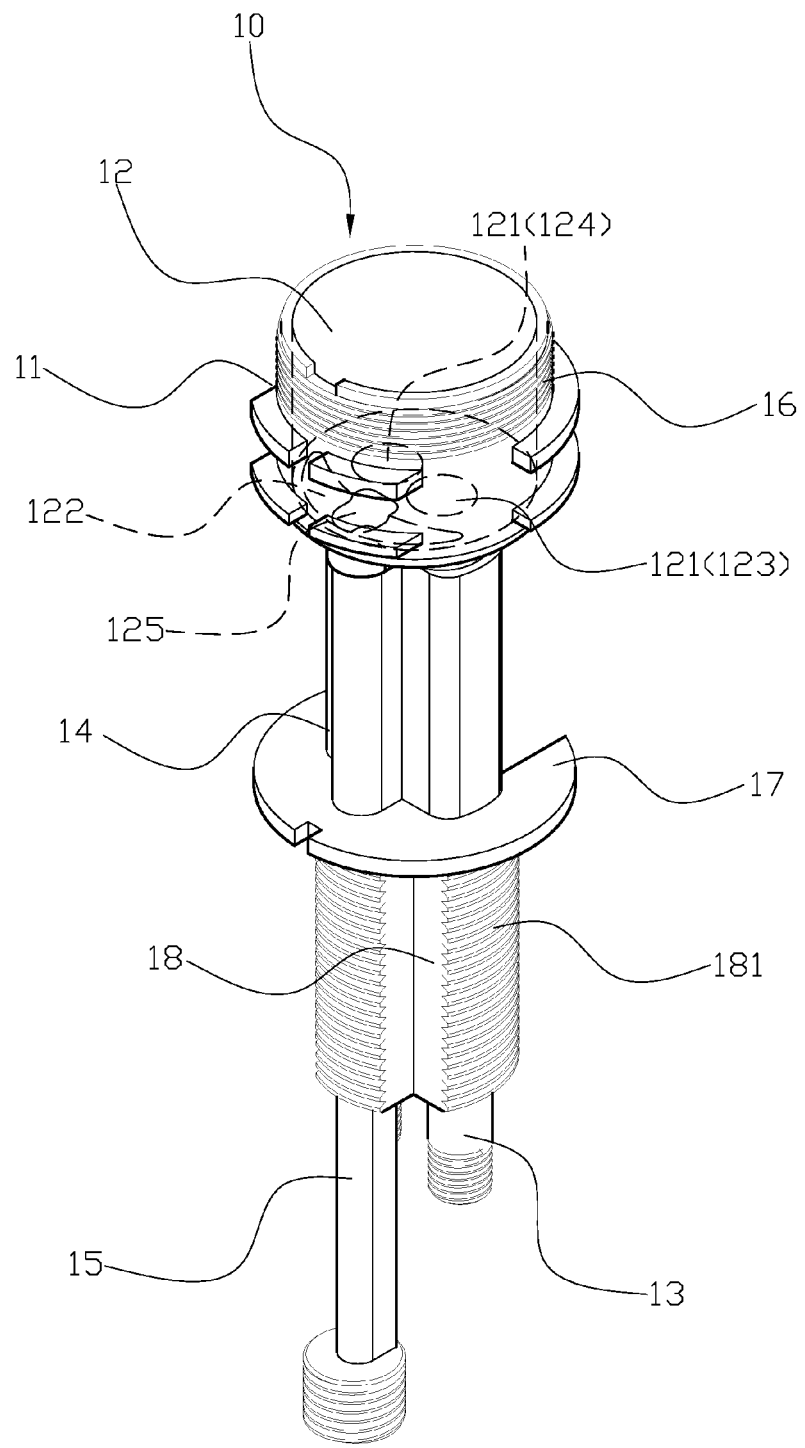
FIG. 1 is a perspective view of an embodiment according to the present invention.
Figure 2:
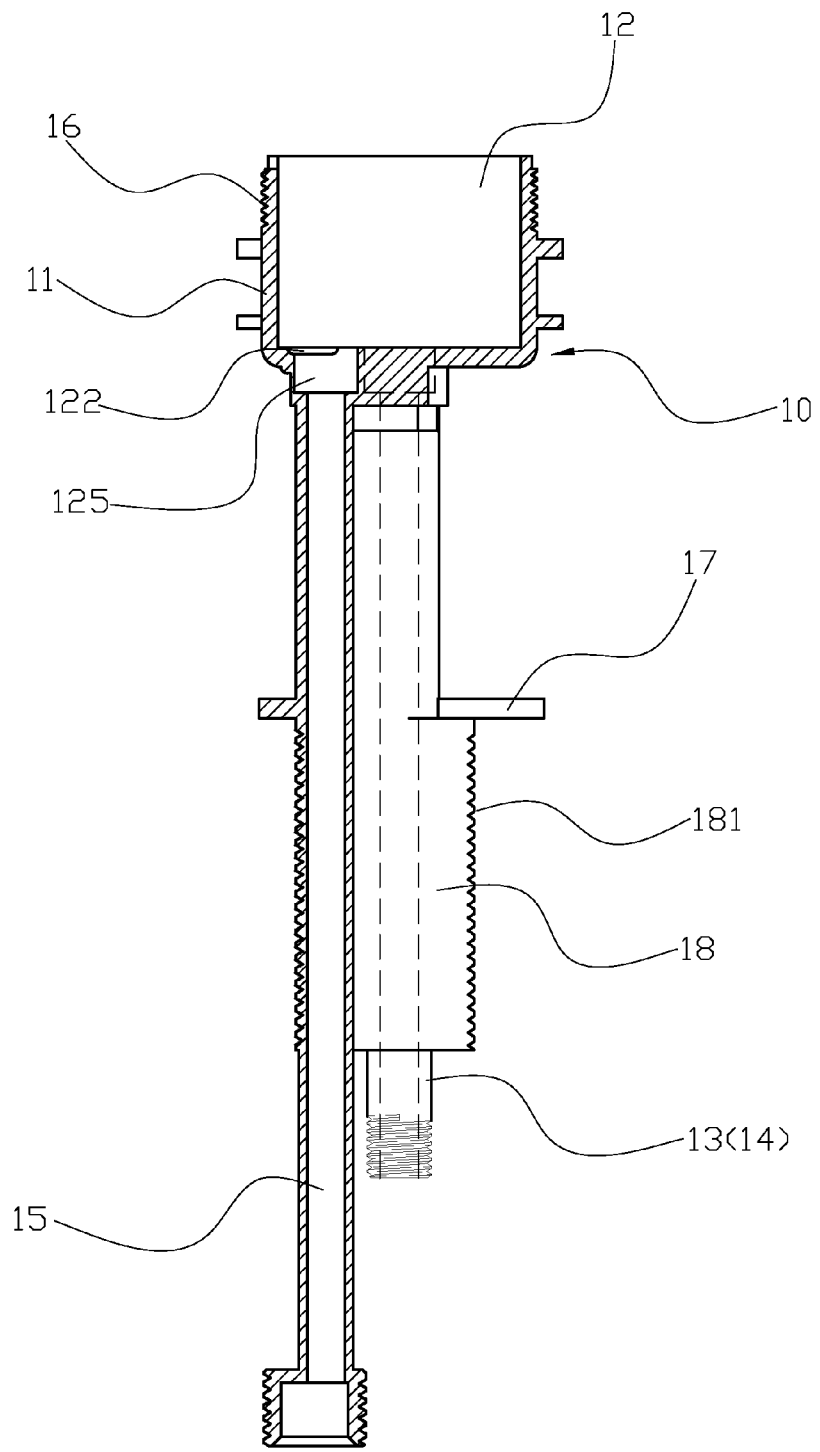
FIG. 2 is a cross-sectional drawing of the embodiment according to the present invention.
Figure 3:
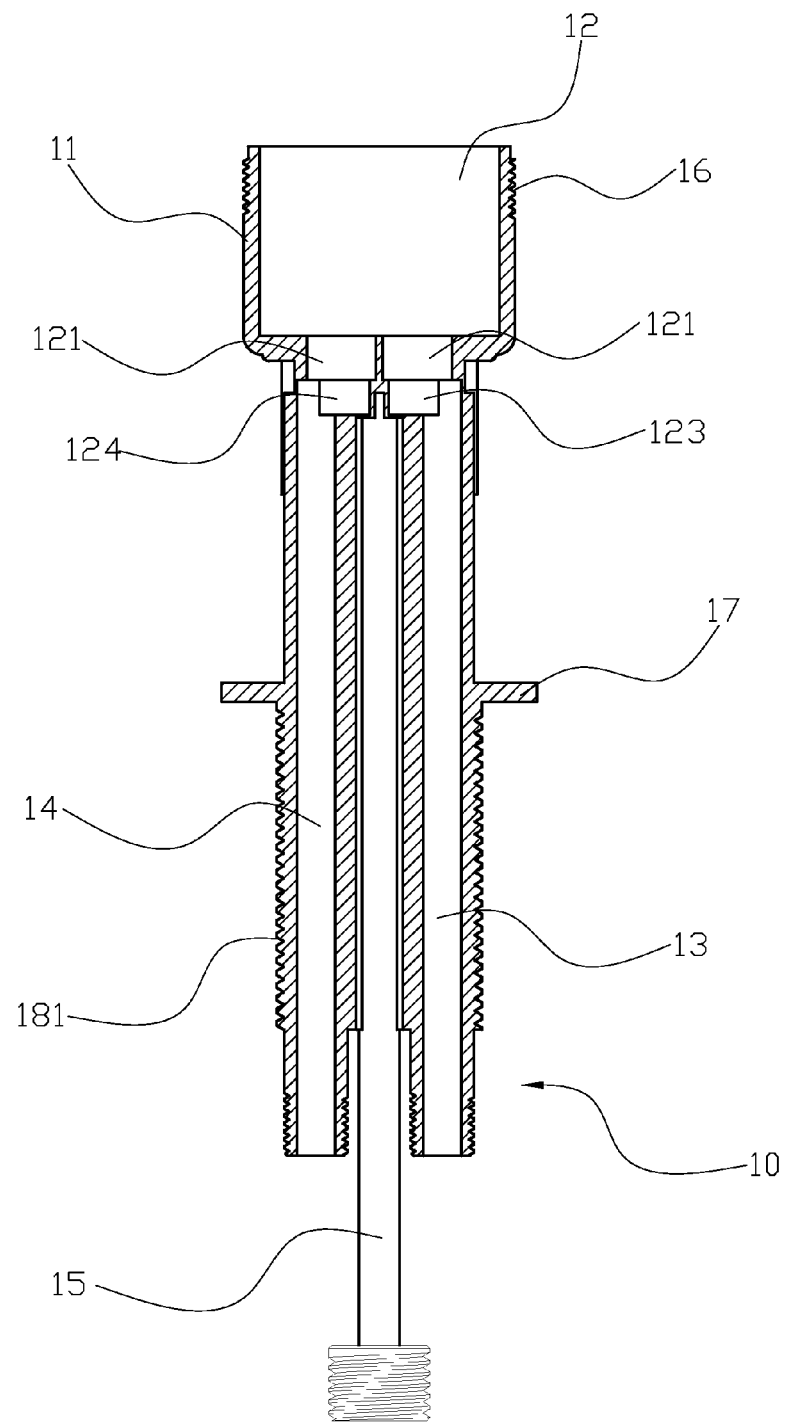
FIG. 3 is another cross-sectional drawing of the embodiment according to the present invention.

First, please refer to FIG. 1 to FIG. 3. A faucet module 10 comprises a base 11, a valve chamber 12 formed in the base 11, and a bottom of the base 11 is in communications with a cold water inlet pipe 13, a hot water inlet pipe 14 and an outlet pipe 15. Furthermore, an inner bottom surface of the valve chamber 12 has two spaced positioning recesses 121, and one side of the two positioning recesses 121 is provided with a mixing trough 122. A cold water inlet port 123, a hot water inlet port 124 and an outlet port 125 are respectively formed in the two positioning recesses 121 and the mixing trough. 122, such that the cold water inlet port 123, the hot water inlet port 124 and the outlet port 125 are in communications with the cold water inlet pipe 13, the hot water inlet pipe 14 and the outlet pipe 15. A first threaded section 16 is formed at an outer periphery of an opening of the valve chamber 12, and a C-shaped flange 17 is formed around the cold water inlet pipe 13, the hot water inlet pipe 14 and the outlet pipe 15 at a predetermined position away from the bottom face of the base 11. a protrusion 18 having a second threaded section 181 are respectively formed at an end of the cold water inlet pipe 13, the hot water inlet pipe 14 and the outlet pipe 15 below the flange 17, and all of the base 11, the valve chamber 12, the positioning recesses 121, the mixing trough 122, the cold water inlet port 123, the hot water inlet port 124, the outlet port 125, the cold water inlet pipe 13, the hot water inlet pipe 14, the outlet pipe 15, the first screw thread section 16, the flange 17, the protrusion 18 and the second screw thread section 181 formed as an entire unit by a plastic injection forming method.

Figure 4:
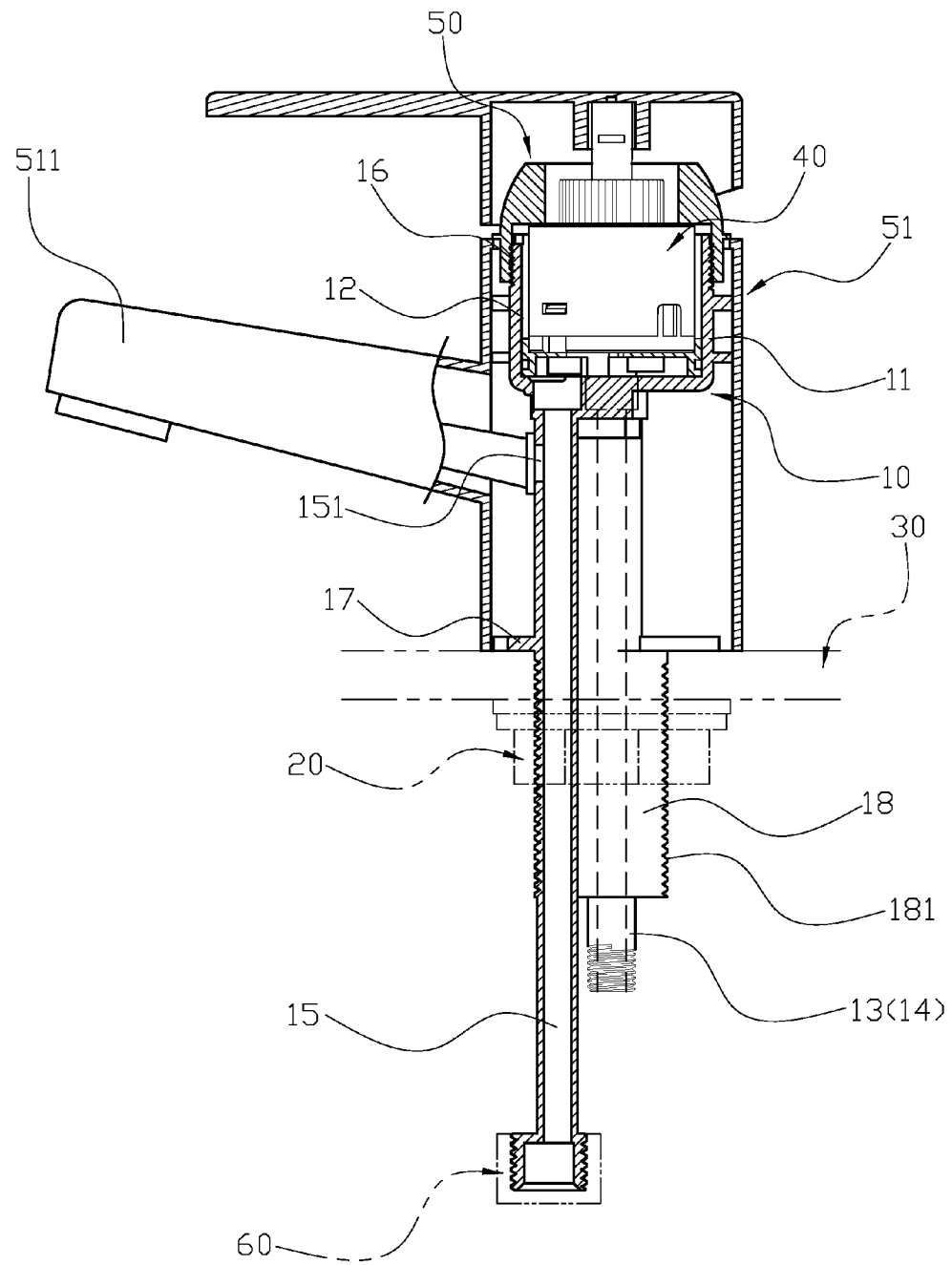
FIG. 4 is a usage schematic drawing of the embodiment is a cross-sectional drawing of the embodiment according to the present invention.
Figure 5:
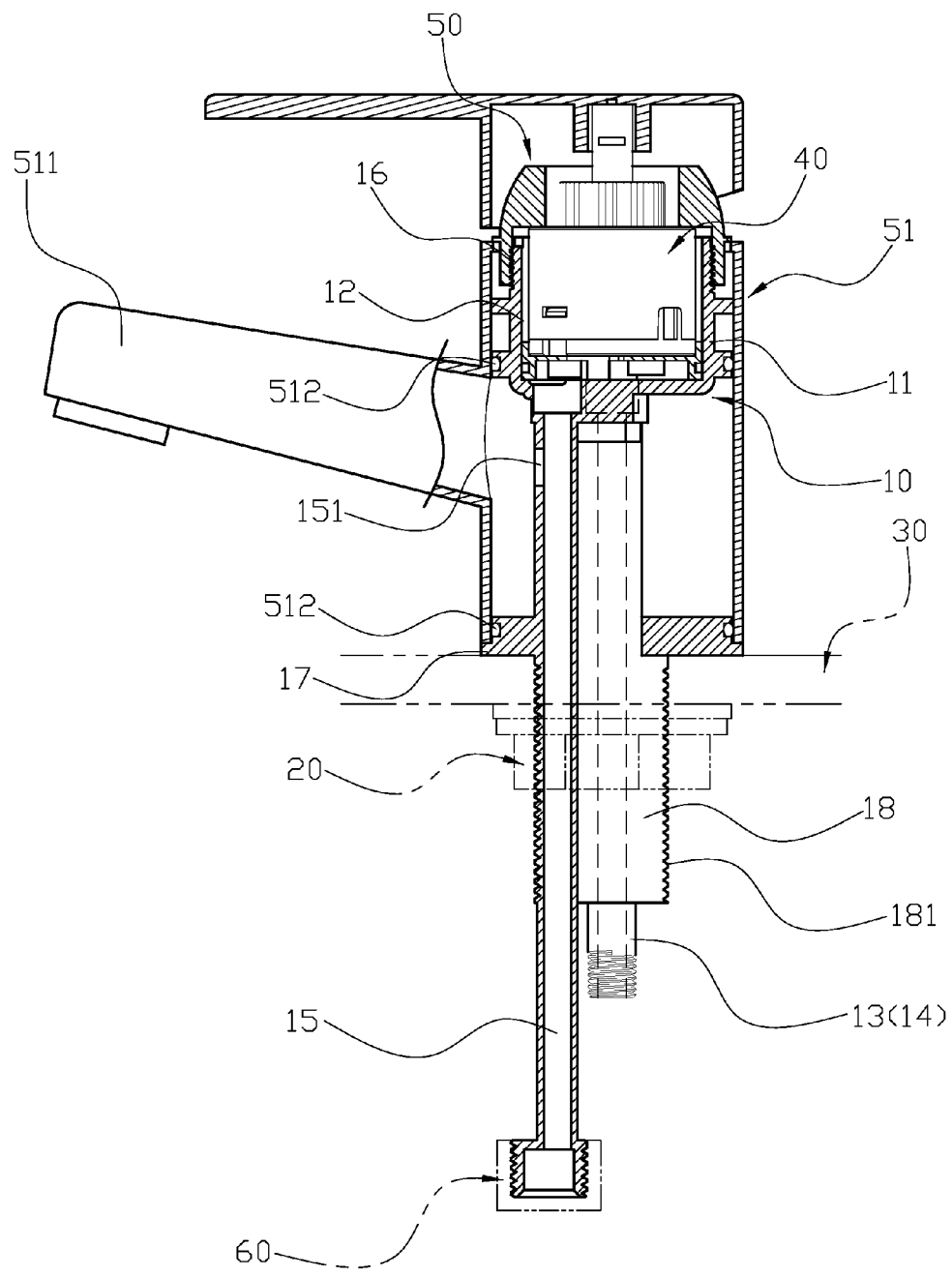
FIG. 5 is another usage schematic drawing of the embodiment is a cross-sectional drawing of the embodiment according to the present invention.
Figure 6:
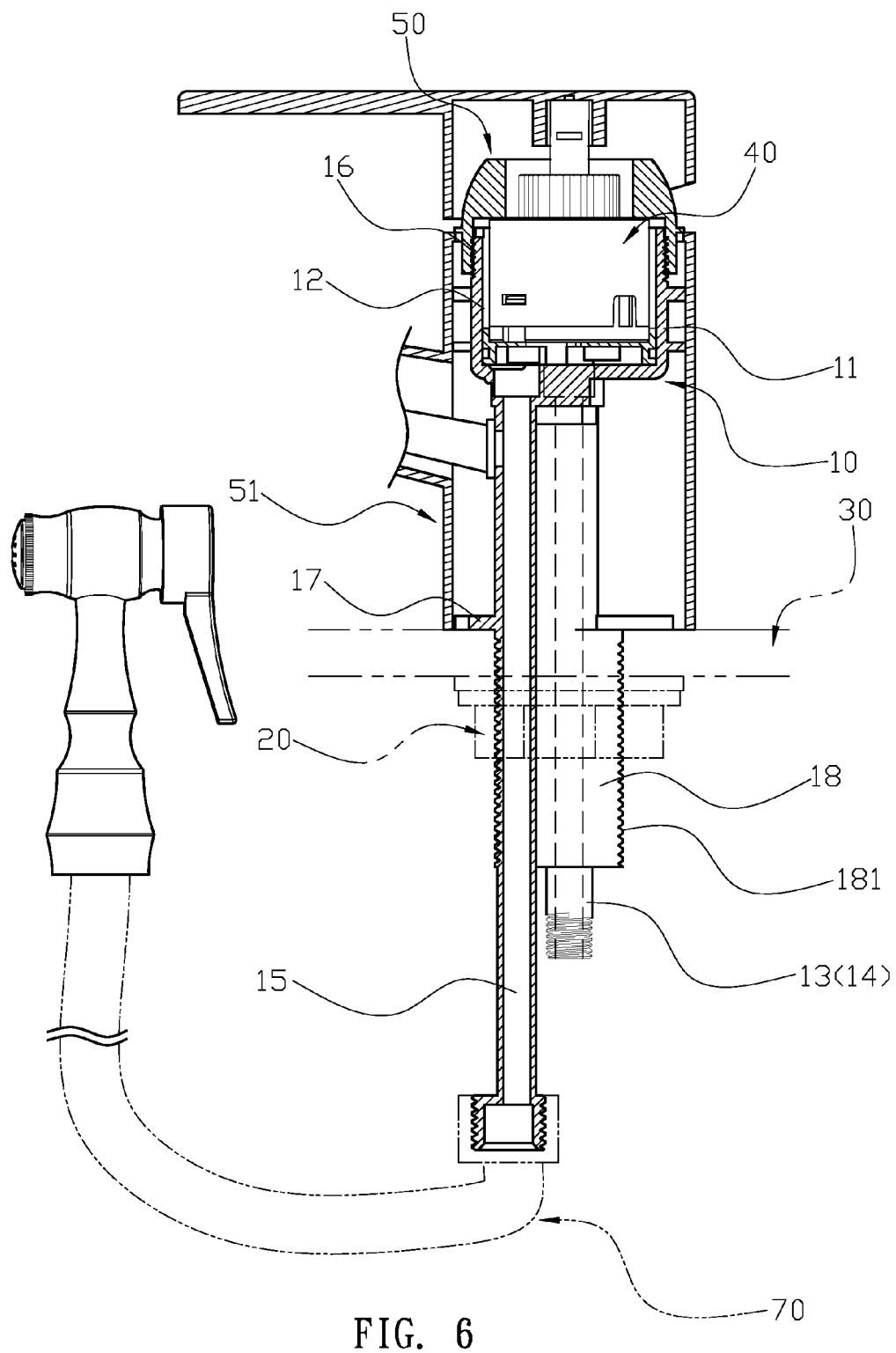
FIG. 6 is another usage schematic drawing of the embodiment is a cross-sectional drawing of the embodiment according to the present invention.
Figure 7:
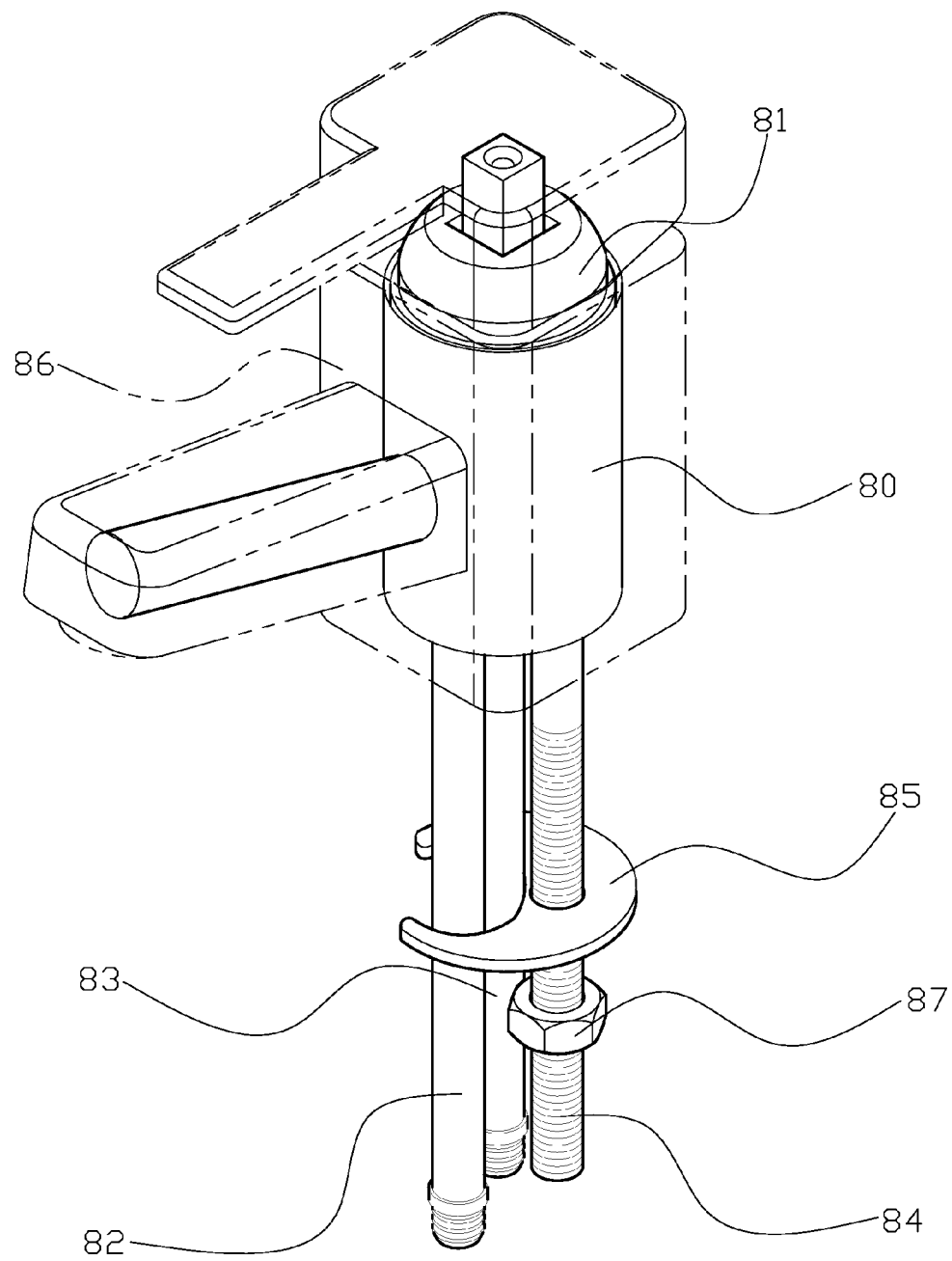
FIG. 7 is a perspective view of a prior art faucet.

For actual assembly, the cold water inlet pipe 13, the hot water inlet pipe 14 and the outlet pipe 15 of the faucet module 10 are all placed through corresponding holes at a desired location. The flange 17 is pressed towards the second threaded section 181 by a nut 20 for installation of the faucet module 10 at a platform 30 provided at the desired location such as a sink or vanity, and a control valve 40 is placed in the valve chamber 12 of the faucet module 10. The faucet module is designed to accept a faucet shroud 50 and a faucet body 51, the control valve 40 is compressed to prevent disengagement, and wherein the faucet shroud 50 is screwed onto the first threaded section 16. When the desired location provides water at a front end, a sealing sleeve 60 is installed to seal the end of the outlet pipe 15 such that the outlet pipe 15 has an opening 151 at a front position matching a corresponding through aperture on an extended tube 511 of the faucet body 51, as shown in FIG. 4. The faucet body 51 is removable and respectively has a sealing ring 512 at an upper position and a lower position on an inner surface such that the faucet body 51 can be rotated on the faucet module 10 to change the position of a main water outlet, as shown in FIG. 5. When the faucet module 15 is connected to a shower head or a sprayer, the end of the outlet pipe 15 is directly connected to a flexible pipe 70, as shown in FIG. 6.

Furthermore, the faucet module 10 has a metal layer on its inner surface to improve the strength of the faucet module 10.

Accordingly, the faucet module of the present invention has following benefits: 1. The faucet module 10 has the base 11, the cold water inlet pipe 13, the hot water inlet pipe 14, the outlet pipe 15 and the flange 17 as an entire unit, it is easier to be manufactured and assembled. 2. The faucet module 10 has the valve chamber 12, the cold water inlet port 123, the hot water inlet port 124 and the outlet port 125 as an entire unit, there is no need to drill holes on the faucet module 10, which can reduce the manufacture cost. 3. The cold water inlet pipe 13, the hot water inlet pipe 14 and the outlet pipe 15 are formed an entire unit on the base 11, therefore, there is no welding required, which can reduce the chance of water leakage. 4. The faucet module 10 is made by the plastic injection method; therefore the total weight can be reduced.

Although the present invention has been explained in relation to its preferred embodiment, it is to be understood that many other possible modifications and variations can be made without departing from the spirit and scope of the invention as hereinafter claimed.

What is claimed is:

1. A faucet module comprising a base, a valve chamber formed in the base, a bottom of the base in communications with a cold water inlet pipe, a hot water inlet pipe and an outlet pipe, an inner bottom surface of the valve chamber in communications with a cold water inlet port, a hot water inlet port and an outlet port respectively, the cold water inlet port, the hot water inlet port and the outlet port in communications with the cold water inlet pipe, the hot water inlet pipe and the outlet pipe respectively, a first threaded section formed at an outer periphery of an opening of the valve chamber, a flange formed around the cold water inlet pipe, the hot water inlet pipe and the outlet pipe at a predetermined position away from the bottom face of the base, a protrusion having a second threaded section respectively formed at an end of the cold water inlet pipe, the hot water inlet pipe and the outlet pipe below the flange, each of the base, the valve chamber, the cold water inlet port, the hot water inlet port, the outlet port, the cold water inlet pipe, the hot water inlet pipe, the outlet pipe, the first threaded section, the flange, the protrusion and the second threaded section formed as an entire unit by plastic injection;

wherein during assembly, the cold water inlet pipe, the hot water inlet pipe and the outlet pipe of the faucet module are all placed through corresponding holes at a desired location; the flange is pressed towards the second threaded section for installation of the faucet module at the desired location, and a control valve is placed in the valve chamber of the faucet module; the faucet module designed to accept a faucet shroud and a faucet body, the control valve compressed to prevent disengagement, and wherein the faucet shroud is screwed onto the first threaded section.

2. The faucet module as claimed in claim 1, wherein the faucet module is made by a plastic injection forming method.

3. The faucet module as claimed in claim 1, wherein the faucet module has a metal layer on its inner surface to improve the strength of the faucet module.

4. The faucet module as claimed in claim 1, wherein an inner bottom surface of the valve chamber has two spaced positioning recesses, one side of the two positioning recesses provided with a mixing trough, and the cold water inlet port, the hot water inlet port and the outlet port are respectively formed in the two positioning recesses and the mixing trough.

5. The faucet module as claimed in claim 1, wherein the flange is C-shaped.

6. The faucet module as claimed in claim 1, wherein the desired location provides water at a front end, a sealing sleeve is installed to seal the end of the outlet pipe such that the outlet pipe has an opening at a front position matching a corresponding through aperture of the faucet body.

7. The faucet module as claimed in claim 6, wherein the faucet body is removable and respectively has a sealing ring at an upper position and a lower position on an inner surface such that the faucet body can be rotated on the faucet module to change the position of a main water outlet.

8. The faucet module as claimed in claim 1, wherein when the faucet module is connected to a shower head or a sprayer, the end of the outlet pipe is directly connected to a flexible pipe.

* * * * *